Figure 1:
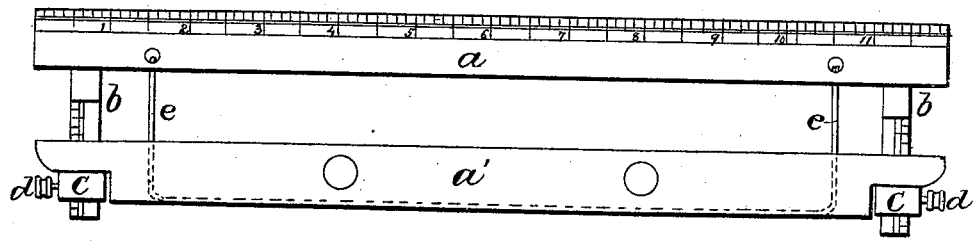

F. A. Traut.

Parallel Rules.

N° 85,708.   Patented Jan. 5, 1869.

Witnesses:
E. M. Bliss
Jerry W. Bliss

Inventor,
Frederick A. Traut

FREDERICK A. TRAUT, OF NEW BRITAIN, CONNECTICUT.

Letters Patent No. 85,708, dated January 5, 1869.

IMPROVEMENT IN PARALLEL RULER.

The Schedule referred to in these Letters Patent and making part of the same.

*To all whom it may concern:*

Be it known that I, FREDERICK A. TRAUT, of New Britain, county of Hartford, and State of Connecticut, have invented certain new and useful Improvements in Parallel Rule; and to enable others skilled in the art to make and use the same, I will proceed to describe its construction and operation, by referring to the drawings, in which the same letters indicate like parts in each of the figures.

The nature of this invention will be understood from the specification and drawings.

The object desired to be obtained thereby is to secure perfect uniformity of action and parallelism.

In the accompanying drawings—

Figure 2:
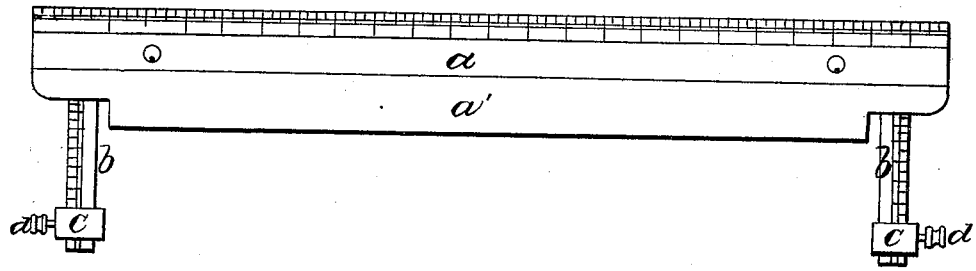

Figures 1 and 2 are plan views.

Figure 3:
Figure 4:
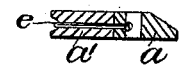

Figures 3 and 4, section end views.

$a$ $a'$ are the two parts of the rule, which move in a line at right angles with each other.

$b$ $b$ are scale-guide bars, one end of which is secured in the rule $a$, proper.

The rule $a'$ is provided with mortises to receive the guide-bars $b$ $b$.

These bars are provided with collars $c$ $c$ and set-screws $d$ $d$. The object of these collars and set-screws is to regulate the exact distance at each end. It may be desirable to expand one part from the other, or so that the distance may be fixed so as to expand the rules more or less at one end than at the other.

$e$ is an elastic cord, arranged in a groove in the back edge of the rule $a'$ passing through holes formed at each end thereof, and secured in depressions formed in the edge of the rule $a$.

Now, in using this rule, first set the collars $c$ by the scale marked on the rods or bars $b$ at the distance it is desirable these rules shall expand at each end; then fix the distance by the set-screws $d$; then, with one hand firmly upon the rule $a$, draw a line in the usual way; then expand the rule $a'$ against the collars $c$, and hold it firmly to the surface upon which the lines are being drawn, and the rule $a$ will quickly assume its position close to the rule $a'$ by the action of the elastic cord $e$.

This rule, being made basil-edged, may be used for pencil or ink-lining by turning it over from one side to the other in the common way.

I believe I have thus shown the nature, construction, and advantage of this invention, so as to enable others skilled to make and use the same therefrom.

What I claim, therefore, and desire to secure by Letters Patent, is—

The elastic cord $e$, in combination with the guide-bars $b$ $b$, collars $c$ $c$, and rules $a$ $a'$, constructed and arranged substantially as described.

FREDERICK A. TRAUT. [L. S.]

Witnesses:
E. W. BLISS,
JEREMY W. BLISS.